United States Patent
Schlegel et al.

(10) Patent No.: US 9,700,997 B2
(45) Date of Patent: Jul. 11, 2017

(54) HAND POWER TOOL

(71) Applicant: Robert Bosch GmbH, Stuttgart (DE)

(72) Inventors: Andreas Schlegel, Leinfelden-Echterdingen (DE); Simon Schart, Aichelberg (DE); Michael Hoffmann, Gablingen (DE)

(73) Assignee: Robert Bosch GmbH, Stuttgart (DE)

( * ) Notice: Subject to any disclaimer, the term of this patent is extended or adjusted under 35 U.S.C. 154(b) by 382 days.

(21) Appl. No.: 14/314,438

(22) Filed: Jun. 25, 2014

(65) Prior Publication Data

US 2014/0379136 A1  Dec. 25, 2014

(30) Foreign Application Priority Data

Jun. 25, 2013 (DE) .................. 10 2013 212 003

(51) Int. Cl.
*B25B 21/00* (2006.01)

(52) U.S. Cl.
CPC .... *B25B 21/00* (2013.01); *G05B 2219/35481* (2013.01); *G05B 2219/42122* (2013.01)

(58) Field of Classification Search
None
See application file for complete search history.

(56) References Cited

U.S. PATENT DOCUMENTS

| 7,893,586 B2* | 2/2011 | West | H02K 23/36 310/140 |
| 2003/0006051 A1* | 1/2003 | Schmitzer | B25D 17/043 173/49 |
| 2013/0000938 A1* | 1/2013 | Matsunaga | B25B 21/008 173/181 |
| 2014/0159920 A1* | 6/2014 | Furui | B25F 5/02 340/870.07 |
| 2015/0162646 A1* | 6/2015 | Kawase | H01M 2/1022 429/7 |

FOREIGN PATENT DOCUMENTS

| DE | 195 31 484 A1 | 2/1997 |
| DE | 103 35 017 A1 | 2/2005 |
| DE | 10 2007 035 095 A1 | 1/2009 |
| DE | 10 2011 003 828 A1 | 8/2012 |
| DE | 10 2011 121 448 A1 | 6/2013 |
| WO | 2012/041547 A1 | 4/2012 |

* cited by examiner

*Primary Examiner* — Ronald Hartman, Jr.
(74) *Attorney, Agent, or Firm* — Maginot, Moore & Beck LLP

(57) ABSTRACT

A hand power tool, in particular a battery-operated hand power tool, includes an open-loop and/or closed-loop control unit, and a communication unit, which is connected to the open-loop and/or closed-loop control unit and which has a hand power tool interface for exchanging electronic data. It is proposed that the hand power tool interface be provided to communicate with at least one further hand power tool and/or with at least one hand power tool ancillary device for the purpose of influencing an operating program of the open-loop and/or closed-loop control unit.

8 Claims, 2 Drawing Sheets

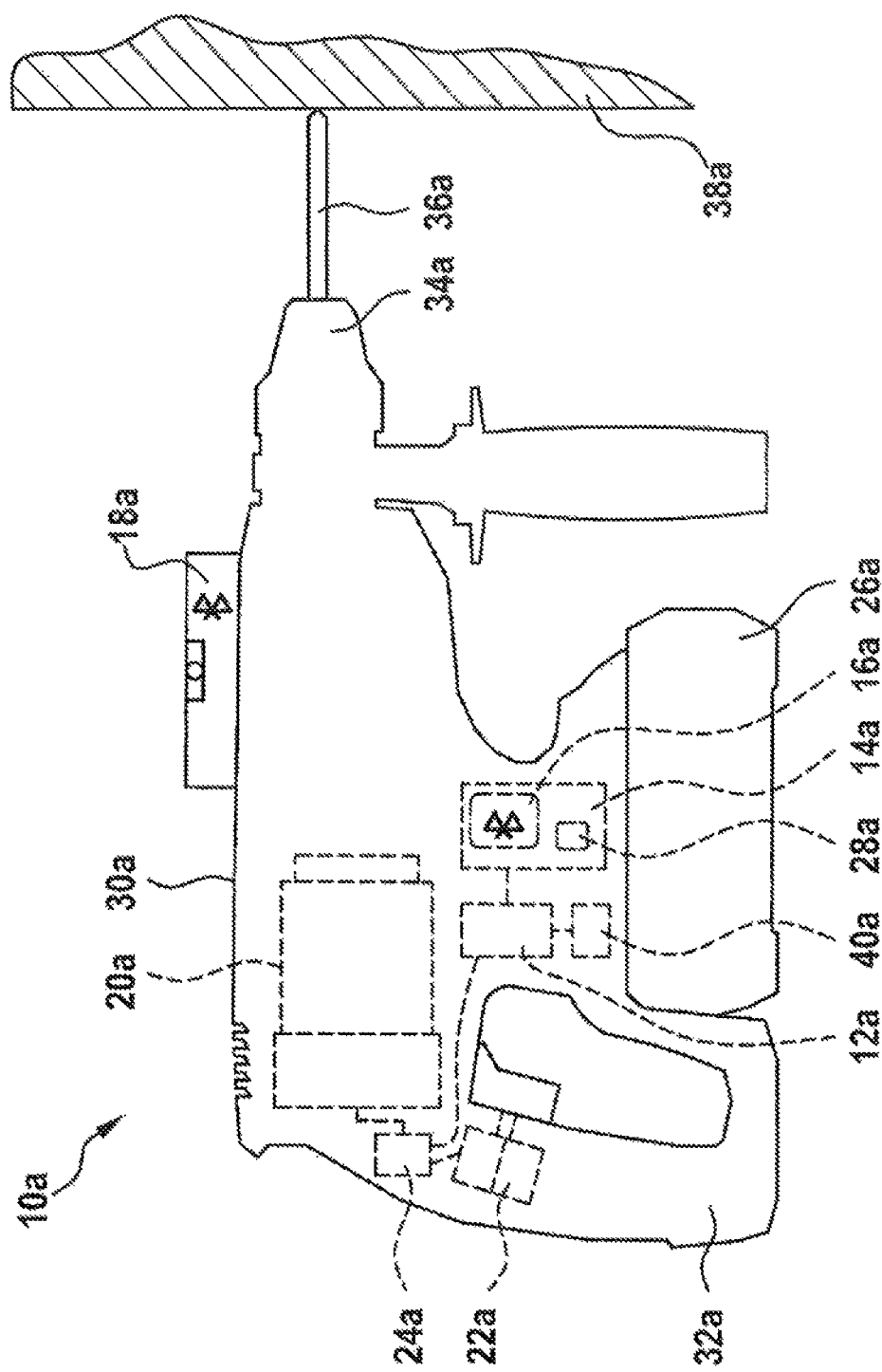

HAND POWER TOOL

This application claims priority under 35 U.S.C. §119 to patent application no. DE 10 2013 212 003.6, filed on Jun. 25, 2013 in Germany, the disclosure of which is incorporated herein by reference in its entirety.

BACKGROUND

A hand power tool has already been proposed, in particular a battery-operated hand power tool, having an open-loop and/or closed-loop control unit, and having a communication unit, which is connected to the open-loop and/or closed-loop control unit and which has a hand power tool interface for exchanging electronic data.

SUMMARY

The disclosure is based on a hand power tool, in particular a battery-operated hand power tool, having an open-loop and/or closed-loop control unit, and having a communication unit, which is connected to the open-loop and/or closed-loop control unit and which has a hand power tool interface for exchanging electronic data.

It is proposed that the hand power tool interface be provided to communicate with at least one further hand power tool and/or with at least one hand power tool ancillary device, for the purpose of influencing an operating program of the open-loop and/or closed-loop control unit. In particular, a "hand power tool" is to be understood to mean, in particular, a portable machine for performing machining work on workpieces, but advantageously a power drill, a hammer drill, a percussion hammer, a saw, a plane, a screwdriver, a router, a sander, an angle grinder, a garden appliance, a construction site measuring device and/or a multifunction tool. An "open-loop and/or closed-loop control unit" is to be understood to mean, in particular, a unit having at least one control electronics system. A "control electronics system is to be understood to mean, in particular, a unit having a processor unit and a storage unit, and having an operating program stored in the storage unit. Particularly preferably, the operating program has at least one closed-loop control routine, an open-loop control routine and/or a calculation routine. The open-loop and/or closed-loop control unit is preferably provided to set a rotational speed, a torque, a starting time, a percussion rate, a closed-loop controller ratio and/or further operating parameters considered appropriate by persons skilled in the art. "Provided" is to be understood to mean, in particular, specially programmed, specially designed and/or specially equipped. In particular a hand power tool can communicate with one hand power tool ancillary device or with a plurality of hand power tool ancillary devices simultaneously, thereby enabling a machining operation or work step to be simplified. The design of the hand power tool according to the disclosure makes it possible to reduce machining costs, while at the same time improving the quality of machining. A "communication unit" in this context is to be understood to mean, in particular, a unit provided for exchanging electronic data signals and/or control signals. Preferably, this is to be understood to mean, in particular, a unit provided at least to actively and/or passively transmit electronic data and/or control signals, in particular to a receiving unit. In this case, transmission of the electronic data and/or control signals may be effected both by analog transmission and, in particular, by digital transmission. A "hand power tool interface" is to be understood here to mean, in particular, an interface provided for exchanging electronic data. In this case, electronic data can be exchanged by means of the interface for the purpose of evaluating and/or diagnosing and/or documenting operating parameters of the hand power tool. Preferably, the interface comprises at least one data input and at least one data output. Preferably, the data flow of the interface unit is designed to be bidirectional. A "hand power tool ancillary device" is intended to designate any ancillary device that is used by trade craftsmen or in DIY work, for example a distance measuring device, an angle measuring device, a level, an ammeter and/or a voltmeter, a wall scanner, an environment device or the like. Preferably, the hand power tool ancillary device has a wireless and/or wire-bound interface for exchanging electronic data. The wall scanner may be used, particularly advantageously, for detecting metal or plastic or other materials. In particular, various environment devices may be used, which may have only one or a plurality of the following properties or functions. An exemplary embodiment of an environment device is suitable, in particular, for measuring the air pressure, to which, for example, the impact mechanism of a hand power tool or of a hammer drill may be set. Moreover, an environment device may be used to detect methane gas in a mine. Furthermore, an environment device may measure a sound pressure and, if necessary, restrict the output of the hand power tool. In particular, the said items of information or measurement values of an environment device can be made available simultaneously to a plurality of hand power tools. The hand power tool ancillary device may have an anti-theft means, by which the operational readiness of the hand power tool ancillary device is enabled only after a code has been identified by means of the interface. For example, a data carrier, having an electronic enabling key or a PIN code, may be supplied with the hand power tool ancillary device. In a further embodiment, the hand power tool ancillary device may communicate, for example, with a GPS-enabled device (GPS=Global Positioning System), in order to effect a height measurement or locate a position. Hand power tool ancillary devices are distinguished from other types of ancillary devices by being particularly robust and insusceptible to dust. The use of at least one hand power tool ancillary device makes it possible to achieve an optimum work result. In particular, the term "communicate" is to be understood to mean to establish a functional, in particular electronic, connection, via which electronic data can be exchanged directly. The term "establish" is to be understood to mean, in particular, that the communication unit picks up the connection at a point in time and advantageously maintains it over a period of time. In particular, the expression "communicate with at least one further hand power tool and/or with at least one hand power tool ancillary device" is to be understood to mean that the communication unit has a hand power tool interface that is provided to communicate simultaneously with a hand power tool or with a plurality of hand power tools and/or with a hand power tool ancillary device or with a plurality of hand power tool ancillary devices. In particular, it is possible to dispense with additional electronic data transmission devices, since a direct electronic connection can be established with at least the further hand power tool and/or with at least the one hand power tool ancillary device, for the purpose of communication, by means of the hand power tool interface of the hand power tool. In particular, a particularly rapid exchange of electronic data can thereby be effected. Advantageously, high appliance costs can thereby be avoided. In particular, the hand power tool according to the disclosure makes it possible to eliminate a fault source. In particular, a machining operation can be performed in a particularly highly effective and precise manner, thereby enabling savings to be made in respect of cost-intensive working time. Owing to the design of the hand power tool according to the disclosure, even complicated machining operations can be performed in a particularly precise and rapid manner with a low resource requirement. In particular, the use of a hand power tool ancillary device makes it possible to achieve an optimum work result. Moreover, particularly advantageously, a plurality of hand power tools can be connected together and used in a partially automatic and/or fully automatic manner. In particular, at least one machining operation, or at least one work step, can be performed with a high reproducibility, since, if the operating program of the open-loop and/or closed-loop control units are influenced in an identical manner, it is likewise possible to achieve consistent machining of a workpiece with a consistently high quality. In particular, it is possible to integrate into the operating program of the open-loop and/or closed-loop control unit a diagnostic tool that, for example, provides a self diagnosis of the hand power tool or outputs information concerning the running time of the hand power tool.

It is proposed that the hand power tool interface be provided to directly transmit to the further hand power tool and/or to the hand power tool ancillary device, or receive from the further hand power tool and/or from the hand power tool ancillary device, electronic data, in a wireless or wire-bound manner. Advantageously, the transmission of the electronic data can be effected in real time during a machining operation and/or when the hand power tool is in a non-operative state. In particular, the machining operation can be optimized during the machining operation and/or after the machining operation. In particular, the transmission of the electronic data between the hand power tool and the hand power tool ancillary device, or between the hand power tool and the further hand power tool, can be effected bidirectionally in each case. Advantageously, the hand power tool interface can be realized as a wireless interface, such that working is rendered particularly convenient. For example, the hand power tool interface may be realized as a WLAN interface, as a WiFi interface, as a Bluetooth interface, as a mobile radio telephony interface, as an infrared interface, as a near-field communication (NFC) interface and/or as another wireless interface considered appropriate by persons skilled in the art. In particular, the near-field communication interface has a high degree of security for contactless exchange of electronic data by radio telephony over short distances, of up to 10 cm, since unintentional communication with a device having NFC can be virtually precluded. Alternatively or additionally, the hand power tool interface may be realized as a wire-bound interface. For example, the hand power tool interface may be realized as a USB interface, as a firewall interface, as a network interface and/or as another wire-bound interface considered appropriate by persons skilled in the art. Owing to the design of the hand power tool interface according to the disclosure, savings can be made in respect of cost-intensive working time and high appliance costs. In particular, through an exchange of electronic data, a plurality of hand power tools can be set to a particular machining operation and communicate simultaneously with only one hand power tool ancillary device. Alternatively or additionally, the hand power tool interfaces of two differing types of hand power tool, in particular differing in their manner of acting upon a workpiece, can communicate with each other, for example a power drill and a sander. Preferably, the open-loop and/or closed-loop control unit has at least one operating program that distinguishes at least two differing types of hand power tool and/or at least two differing hand power tool ancillary devices.

It is additionally proposed that the hand power tool comprise at least one drive unit, and at least one switch-on/switch-off element, at least for putting the drive unit into operation, which is provided to activate or deactivate the hand power tool interface in dependence on a position of the switch-on/switch-off element. Advantageously, the switch-on/switch-off element makes it particularly easy for an operator of the hand power tool to block or enable the hand power tool interface of the hand power tool for an electronic exchange of data. A "drive unit" in this context is to be understood to mean, in particular, a motor unit. Preferably, a "drive unit" is to be understood to mean, in particular, an electrical and/or mechanical and/or pneumatic motor unit that is provided, advantageously, to generate a rotary motion of an output shaft, or of a tool receiver, when in operation. Advantageously, this is to be understood to mean, in particular, an electric motor. A "switching unit" is to be understood to mean, in particular, an electronic element provided to establish and/or break an electrically conducting connection between two points, in particular between contacts of the switching element. In particular, the switching element has at least one control contact, via which it can be switched. In particular, the switching element is realized as a semiconductor switching element, in particular as a transistor, advantageously as a bipolar transistor, having a preferably insulated gate electrode (IGBT). Alternatively, the switching element is realized as a mechanical and/or electromechanical switching element, in particular as a relay. Advantageously, by means of one switching element the operator can particularly easily activate, or supply a nominal voltage to, both the drive unit and the hand power tool interface, or deactivate the drive unit and the hand power tool interface.

Furthermore, it is proposed that the hand power tool interface can be switched to a connectivity mode, at least for a period of less than 15 minutes, as a result of the switch-on/switch-off element being moved into a startup position and in dependence on a data connection to the further hand power tool and/or to the hand power tool ancillary device. Advantageously, the hand power tool can automatically establish a data connection to the further hand power tool and/or to the hand power tool ancillary device. Advantageously, an interrupted data connection can be restored automatically. In particular, the hand power tool interface assumes a monitoring function that, upon identification of the further hand power tool and/or the hand power tool ancillary device, automatically establishes a data connection and activates the hand power tool interface for the duration of the communication. In particular, the hand power tool has a protective function that, in the case of non-identification of the further hand power tool and/or the hand power tool ancillary device, deactivates the hand power tool interface within a predefined time period. In particular, the time period for switching to the connectivity mode can be set by the operator. For example, the connectivity mode of the hand power tool may be deactivated automatically after a defined time period, in particular after more than 3 minutes, advantageously after more than 5 minutes, preferably after more than 10 minutes and/or after less than 30 minutes, advantageously after less than 25 minutes, and preferably after less than 20 minutes. As a result, even if a distance in relation to a further hand power tool and/or to the hand power tool ancillary device is unintentionally exceeded, the switching of the hand power tool interface to the connectivity mode can be restored automatically, thus providing for convenient operation and improved safety of the hand power tool. Advantageously, this provides for easy and/or particularly operator-friendly, or convenient, handling of the hand power tool.

Additionally proposed is at least one electronic anti-theft means, which is provided to release or disable an operational readiness, such that, advantageously, there is little incentive for theft of the hand power tool. An "anti-theft means" is to be understood to mean, in particular, a means that prevents operation of the hand power tool by an unauthorized user. Advantageously, the anti-theft means is realized so as to be at least partially integral with the hand power tool interface or with another electronic element of the hand power tool that switches off an essential unit such as, for example, the drive unit of the hand power tool. It is thereby possible to avoid the use of a further, external device. Alternatively or additionally, the anti-theft means is realized as an electronic enabling key or as a computer, separate from the hand power tool. Both an anti-theft means realized so as to be integral with the hand power tool interface and an anti-theft means realized as a data carrier having an electronic enabling key or as a computer, separate from the hand power tool, provide for particularly convenient use of the hand power tool. In particular, a "computer" is to be understood to mean a personal computer, a notebook, a handheld computer, a mobile telephone, a smartphone and/or another computer considered appropriate by persons skilled in the art. Both the data carrier having the electronic enabling key and the computer have an interface that can communicate with the hand power tool interface of the hand power tool. Advantageously, the interface is realized as a wire-bound interface. For example, the interface may be realized as a USB interface, as a firewall interface, as a network interface and/or as another wire-bound interface considered appropriate by persons skilled in the art. Advantageously or additionally, the interface is realized as a wireless interface. For example, the interface may be realized as a WLAN interface, as a WiFi interface, as a Bluetooth interface, as a mobile radio telephony interface, as an infrared interface, and/or as another wireless interface considered appropriate by persons skilled in the art. "Disable" is to be understood to mean, in particular, that the anti-theft means prevents the operational readiness of the hand power tool. Advantageously, the anti-theft means prevents a connection, in particular an electrical connection, such that unauthorized access to, or use of, the hand power tool is not possible. In particular, "release" is to be understood to mean to provide an electrical connection that puts a hand power tool into an operationally ready state. The anti-theft means provides for particularly convenient handling of the operational readiness of the hand power tool. In particular, the hand power tool may have an anti-theft means provided to identify the hand power tool interface. In particular, "identify" is to be understood to mean that the anti-theft means is provided to distinguish differing hand tools, in particular also hand tools of a type of hand power tool. Preferably, the anti-theft means has further means, considered appropriate by persons skilled in the art, that can release or disable the operational readiness of the hand power tool. Advantageously, the hand power tool can only be activated and used when the operational readiness of the hand power tool has been released. In particular, the operational readiness of the hand power tool can be ended, in that the anti-theft means deactivates the release of the operational readiness of the hand power tool. In particular, anti-theft protection can be achieved through inelaborate design means, for example in that the drive unit must be activated separately by the operator. In addition, this prevents unintentional or uncontrolled access to or manipulation of the hand power tool. In an alternative embodiment, an electronic enabling key may be used to release the hand power tool, as a leased or rental appliance, for a defined operating period, or the operating period or running time may be read out retroactively from the hand power tool interface of the hand power tool.

Furthermore, it is proposed that a release by the electronic anti-theft means be maintained after breaking of a connection of a battery unit within a predefined time period. A "battery unit" is to be understood to mean, in particular, a unit provided to supply energy to a hand power tool, in particular during a working operation. Preferably, the battery unit, in an operationally ready state, is connected to the hand power tool so as to be detachable, in particular without the use of tools. Alternatively or additionally, a battery unit could be integrated into the hand power tool. In particular, it is possible to replace the battery unit without the need to re-release the hand power tool. Advantageously, the communication with the further hand power tool and/or with the hand power tool ancillary device is not interrupted, such that a commenced machining operation can be continued without any significant loss of time following a replacement of the battery unit.

Furthermore, it is proposed that the communication unit comprise at least one storage unit, which can be connected to an external data unit, by means of the hand power tool interface, for the purpose of altering or storing hand power tool parameters. A "storage unit" in this context is to be understood to mean, in particular, a unit provided to store at least an item of information, advantageously independently of a communication unit. Preferably, the storage unit is constituted by a non-volatile data storage device, for non-volatile storage. In this case, a "non-volatile data storage device" in this context is to be understood to mean, in particular, a storage unit that can store items of information and/or other electronic data for a long time, in particular independently of a power supply, and in particular without data losses. Various data storage devices are conceivable, considered appropriate by persons skilled in the art, such as, for example, magnetic storage media, digital memory chips or optical storage devices. The hand power tool parameters can thus be stored, in particular in a fixed manner, on the communication unit. In addition, advantageously, this also enables the hand power tool parameters to be retrieved. Moreover, it is not necessary to repeatedly re-determine the hand power tool parameters. In particular, this makes it possible for hand power tool parameters stored on the communication unit to be altered or processed at any time. For example, an operational speed parameter may be reduced, in order to avoid damaging a workpiece or a concrete wall or, in the case of unchanging, repetitive assembly tasks, the limit of the maximum torque of a machining tool such as, for example, a drill bit, can be set to a defined value.

The disclosure is additionally based on at least one unit for monitoring a battery capacity, the unit being provided to calculate an energy consumption of a battery unit during an operation, thereby advantageously enabling the user to plan his work by means of this unit. An "energy consumption of a battery unit" is to be understood to mean, in particular, an item of information that describes the extent to which a battery unit disposed on the hand power tool becomes discharged during a work operation and/or in a time period. In particular, the term "calculate" is to be understood to mean that, for the purpose of monitoring the battery capacity, the unit calculates a capacity of the battery unit in dependence on at least one item of information of the hand power tool. Preferably, for the purpose of monitoring the battery capacity, the unit calculates an average battery consumption during a work operation. Preferably, for the purpose of monitoring the battery capacity, the unit is provided to identify a case of a plurality of work operations of the same type being performed in succession.

It is proposed that the hand power tool interface be provided to communicate with an external data unit for the purpose of documenting and/or evaluating and/or analyzing electronic data of the communication unit, such that, by simple design means, a setting of the hand power tool parameters stored on the communication unit can be altered, electronic data can be read out and/or electronic data can be transmitted. In particular, an "external data unit" is to be understood to mean a unit having an information input, an information processing system and an information output. Advantageously, the external data unit has at least one processor, a storage device, input and output means, an operating program, closed-loop control routines, open-loop control routines and/or calculation routines. Preferably, the components of the external data unit are disposed on a common printed circuit board and/or, advantageously, disposed in a common housing. The external data unit is preferably realized as a computer considered appropriate by persons skilled in the art, but advantageously as a notebook, as a tablet computer, as a mobile telephone and/or, particularly advantageously, as a smartphone. Alternatively, the computer could be realized as a workstation. The external data unit has an interface that can communicate with the hand power tool interface of the hand power tool. Advantageously, the interface of the external data unit is realized as a wireless interface. For example, the interface of the external data unit may be realized as a WLAN interface, as a WiFi interface, as a Bluetooth interface, as a mobile radio telephony interface, as an infrared interface, and/or as another wireless interface considered appropriate by persons skilled in the art. Alternatively or additionally, the interface of the external data unit is realized as a wire-bound interface. For example, the interface may be realized as a USB interface, as a firewall interface, as a network interface and/or as another wire-bound interface considered appropriate by persons skilled in the art. Preferably, the communication unit receives a reference operating parameter from the external data unit, for the purpose of influencing the hand power tool parameters. In particular, this makes it particularly easy for an operator to set the hand power tool to differing working conditions. In addition, this allows particularly rapid setting of the hand power tool, without specific knowledge on the part of an operator concerning control variables and/or parameters. Advantageously, the communication of the hand power tool sends actual operating parameters to the external data unit, which can store, document, evaluate and analyze the actual operating parameters. In particular, stored operating parameters can be output for the purpose of documenting at least one machining operation. This enables the operator to evaluate, alter or optimize, for example retroactively, operating parameters of the hand power tool that were acquired during the work operation, and to re-transmit them to the hand power tool. In particular, it is possible to read out and evaluate the operating period, or running time, of the hand power tool used as a leased or rental appliance.

Furthermore, it is proposed that the system comprise at least one hand power tool and at least one further hand power tool and/or at least one hand power tool ancillary device, such that, advantageously, incurred costs are particularly low, since direct communication can be effected for the purpose of exchanging electronic data between the hand power tool and at least one further hand power tool and/or at least one hand power tool ancillary device, and consequently it is possible to dispense with costs for further electronic data transmission devices between the hand power tool and at least one further hand power tool and/or at least one hand power tool ancillary device.

In an advantageous realization of the disclosure, it is proposed that the system comprise the hand power tool ancillary device, realized as a distance measuring device for acquisition of a distance, which is provided to transmit to the open-loop and/or closed-loop control unit, via the hand power tool interface, at least one acquired distance characteristic quantity that can be processed by an operating program of the open-loop and/or closed-loop control unit for the purpose of controlling a machining operation. In particular, from the start to the end of the machining operation, the distance measuring device continuously determines a distance, in the form of electronic data, which are transmitted to the hand power tool in real time. Advantageously, this can provide for convenient handling of the hand power tool. In particular, a manual machining operation can be performed with particularly high quality.

In a further advantageous realization of the disclosure, it is proposed that the system comprise the hand power tool ancillary device, realized as a level, which is provided to transmit to the open-loop and/or closed-loop control unit, via the hand power tool interface, at least one acquired position characteristic quantity that can be processed by an operating program of the open-loop and/or closed-loop control unit for the purpose of controlling a machining operation. This can additionally improve convenience of operation, particularly in the case of simultaneous use of another hand power tool ancillary device such as, for example, a distance measuring device. Moreover, the machining operation can be performed particularly rapidly, with a particularly high degree of precision.

Furthermore, it is proposed that the system have a hand power tool ancillary device of a system, thereby making it possible to achieve particularly convenient application of the hand power tool.

The system according to the disclosure is not intended in this case to be limited to the application and embodiment described above. In particular, the system according to the disclosure may have individual elements, components and units that differ in number from a number stated herein, in order to fulfill a principle of function described herein.

BRIEF DESCRIPTION OF THE DRAWINGS

Further advantages are given by the following description of the drawings. The drawings show two exemplary embodiments of the hand power tool according to the disclosure. The drawings, the description and the claims contain numerous features in combination. Persons skilled in the art will also expediently consider the features individually and combine them to create appropriate further combinations.

In the drawings:

FIG. 2 shows a second exemplary embodiment of the battery-operated hand power tool, comprising the communication unit according to the disclosure, and comprising a hand power tool ancillary device, realized as a level.

DETAILED DESCRIPTION

Figure 1:
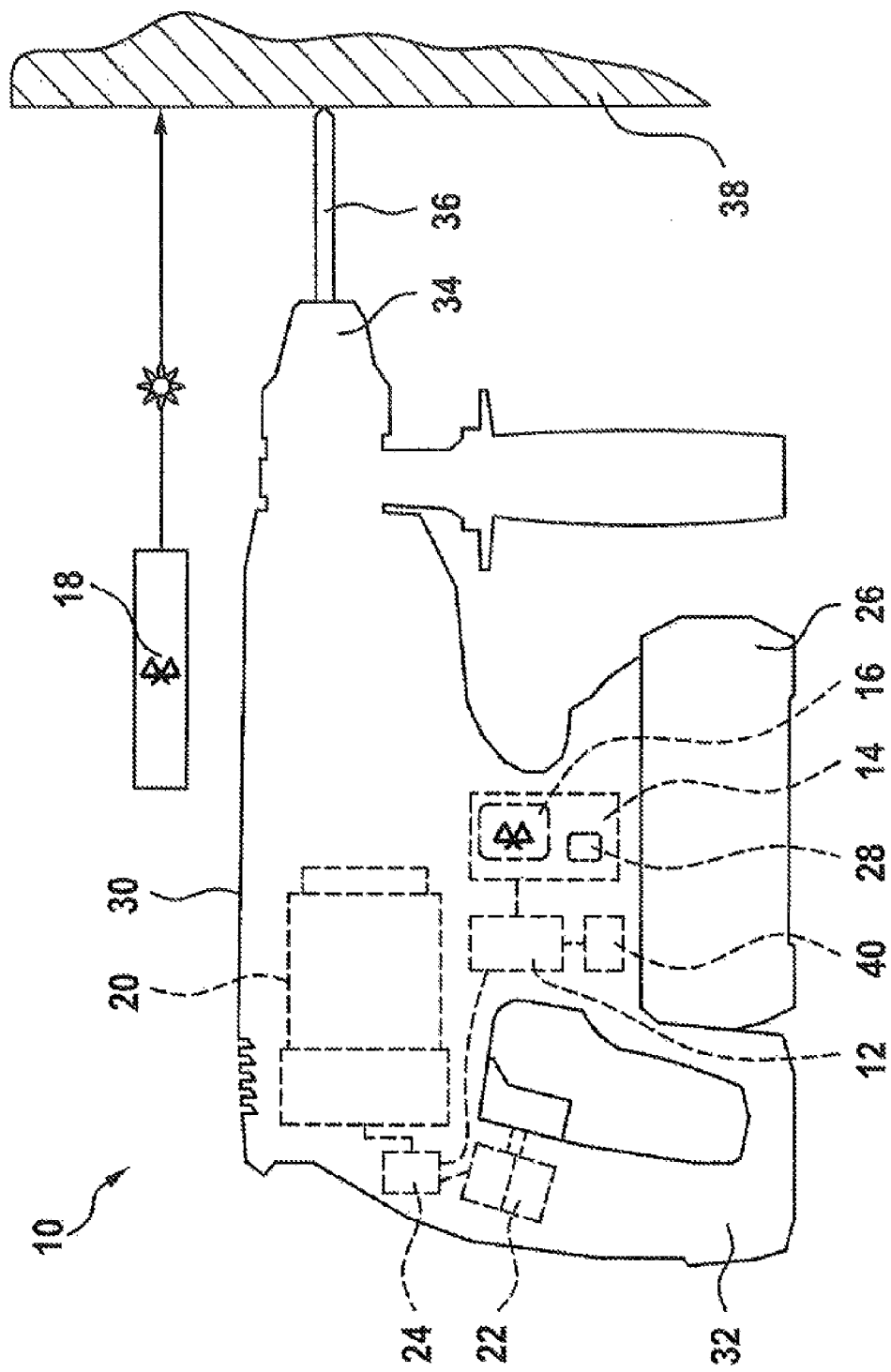
FIG. 1 shows a first exemplary embodiment of a battery-operated hand power tool, comprising a communication unit according to the disclosure, and comprising a hand power tool ancillary device, realized as a distance measuring device.

FIG. 1 shows a first exemplary embodiment of a system comprising a hand power tool 10 according to the disclosure and comprising a hand power tool ancillary device 18. As an alternative or in addition to the hand power tool ancillary device 18, the system has a further hand power tool, not represented here. In the present exemplary embodiment, the hand power tool 10 according to the disclosure is realized as a battery-operated hammer drill and/or chipping hammer. The hand power tool 10 has a housing unit 30, comprising a handle 32, and has a battery unit 26 that is detachably connected to the housing unit 30. The battery unit 26 supplies the hand power tool 10 with energy. The hand power tool 10 additionally comprises a tool receiver 34, in which a tool 36, realized as a drill bit, is received. A drive unit 20 is disposed in the housing unit 30 of the hand power tool 10, and an switch-on/switch-off element 22, for putting the drive unit 20 into operation, is disposed in the handle 32 of the housing unit 30. The drive unit 20 drives the tool receiver 34, at least during a work operation. The hand power tool 10 according to the disclosure has an open-loop and/or closed-loop control unit 12, and has a communication unit 14 connected to the open-loop and/or closed-loop control unit 12. The open-loop and/or closed-loop control unit 12 controls the drive unit 20 by open-loop and closed-loop control. The communication unit 14 has a hand power tool interface 16 for exchanging electronic data. Furthermore, the hand power tool interface 16 is realized to communicate with at least one further the hand power tool and/or with at least one hand power tool ancillary device 18 for the purpose of influencing an operating program of the open-loop and/or closed-loop control unit 12.

The hand power tool interface 16 transmits electronic data, in a wireless and/or wire-bound manner, directly to the further hand power tool and/or to the hand power tool ancillary device 18, or receives electronic data, in a wireless and/or wire-bound manner, from the further hand power tool and/or from the hand power tool ancillary device 18. The hand power tool interface 16 of the communication unit 14 is realized as a Bluetooth interface. In the present exemplary embodiment, the hand power tool 10 communicates wirelessly, via the hand power tool interface 16 of the communication unit 14, with the Bluetooth interface of the hand power tool ancillary device 18. In addition, the hand power tool 10 has a wire-bound hand power tool interface, not visible here, which is realized as a USB interface.

The switch-on/switch-off element 22 activates or deactivates the hand power tool interface 16 in dependence on a position of the switch-on/switch-off element 22. If the switch-on/switch-off element 22 is in a switched-on position of the switch-on element, the hand power tool interface 16 is activated and can consequently exchange electronic data with the further the hand power tool and/or with the hand power tool ancillary device 18. In order to end an exchange of electronic data with the further hand power tool and/or with the hand power tool ancillary device 18, the hand power tool interface 16 is deactivated, in that the switch-on/switch-off element 22 is moved into a switched-off position of the switch-off element. As a result of the switch-on/switch off element 22 being moved into a startup position and in dependence on a data connection to the further the hand power tool and/or to the hand power tool ancillary device 18, the hand power tool interface 16 can be switched to a connectivity mode for a period of less than 15 minutes. If, within the connectivity mode, the hand power tool 10 does not identify any further the hand power tool and/or any hand power tool ancillary device 18, the hand power tool interface 16 is deactivated. If a further hand power tool and/or a hand power tool ancillary device 18 is identified within the connectivity mode, the hand power tool interface 16 of the hand power tool 10 remains activated, and a connection is established for the purpose of exchanging electronic data.

In order that there is little incentive for theft of the hand power tool 10, the hand power tool 10 according to the disclosure has an electronic anti-theft means 24. The electronic anti-theft means 24 is realized to release or disable an operational readiness of the hand power tool 10. In the present exemplary embodiment, the electronic anti-theft means 24, disposed between the switch-on/switch-off element 22 and the drive unit 20, is connected to the open-loop and/or closed-loop control unit 12, to the switch-on/switch-off element 22 and to the drive unit 20 via an electronic line in each case. The hand power tool 10 has an anti-theft means 24 by which the operational readiness is enabled only after a code has been identified by means of the hand power tool interface 16. For example, a data carrier, having an electronic enabling key or a PIN code, may be supplied with the hand power tool 10. In particular, differing operating functions of the hand power tool 10 may be regulated by an electronic operating authorizations having a plurality of electronic enabling keys. Alternatively or additionally, without an electronic enabling key the hand power tool 10 may be used, for example, only at a low rotational speed. Before an initial operation, the data carrier may be wirelessly connected, by means of electronic data exchange, to the hand power tool interface 16, or connected in a wire-bound manner to the hand power tool interface 16. In this case, the electronic key is transmitted from the data carrier to the hand power tool interface 16. The hand power tool interface 16 transmits the electronic enabling key to the open-loop and/or closed-loop control unit 12 of the hand power tool 10, which in turn transmits the electronic enabling key to the anti-theft means 24, for the purpose of releasing the operational readiness of the hand power tool 10.

The hand power tool 10 has a release by the electronic anti-theft means 24 that is maintained after breaking of a connection of the battery unit 26 within a predefined time period. In an operationally ready state, it is possible to replace the battery unit 26, such that the release, or connectivity, of the hand power tool 10 is ensured and the hand power tool 10 does not have to be released after each replacement of the battery unit 26.

The hand power tool 10 has a unit 40 for monitoring a battery capacity, the unit 40 being suitable for calculating an energy consumption of the battery unit 26 during an operation of the hand power tool 10. The unit 40 for monitoring the battery capacity calculates the energy consumption of the battery unit 26 of the hand power tool 10. In addition, the unit 40 for monitoring outputs to the operator, as optical and/or acoustic information, a calculated battery capacity of the battery unit 26 remaining available and a voltage of the battery unit 26. Furthermore, a storage unit 28 of the communication unit 14 stores standard work operations and calculates, in at least one operating state, how many standard work operations are possible with the current battery capacity. In the present exemplary embodiment, the unit 40 for monitoring, disposed between the open-loop and/or closed-loop control unit 12 and the battery unit 26, is connected to the open-loop and/or closed-loop control unit 12 and to the battery unit 26 via an electronic line in each case.

The communication unit 14 comprises the storage unit 28, which can be connected to an external data unit, by means of the hand power tool interface 16, for the purpose of altering or storing hand power tool parameters. During the operation of the hand power tool 10, the communication unit 14 stores hand power tool parameters of the hand power tool 10 that are collected as electronic data on the storage unit 28. The hand power tool parameters of the hand power tool 10 include, for example, tilt information, a voltage of the battery unit 26, a characteristic of a torque and a rotational speed during the work operation, a temperature of the drive unit 20 and of the battery unit 26. The external data unit, not represented here, is realized as a mobile computer having a Bluetooth interface, which communicates with the Bluetooth interface of the communication unit 14. The electronic data stored on the storage unit 28 of the communication unit 14 can be read out and stored at any time by the external data unit. The mobile computer outputs to the operator in real time information that is dependent on the hand power tool parameters. During the operating state, both the hand power tool 10 and the mobile computer can output at least one hand power tool parameter as an acoustic and/or optical signal. In particular, the mobile computer stores a large number of standard work operations. Alternatively or additionally, the mobile computer could call up standard work operations from a central database, not represented here.

The hand power tool interface 16 is realized to communicate with the external data unit for the purpose of documenting and/or evaluating and/or analyzing electronic data of the communication unit 14. The electronic data stored on the external data unit are analyzed, evaluated and documented by means of an operating program of the external data unit. The analyzed and evaluated electronic data can be transmitted, in real time during a machining operation, or after the machining operation, or retroactively, when the hand power tool 10 has been stopped, from the external data unit to the communication unit 14 of the hand power tool 10, and thus change hand power tool parameters of the hand power tool 10.

The system comprises the hand power tool ancillary device 18, which is realized as a distance measuring device, for acquisition of a distance, which is provided to transmit to the open-loop and/or closed-loop control unit 12, via the hand power tool interface 16, at least one acquired distance characteristic quantity that can be processed by an operating program of the open-loop and/or closed-loop control unit 12 for the purpose of controlling a machining operation. The distance measuring device has a Bluetooth interface, which communicates with the Bluetooth interface of the communication unit 14 of the hand power tool 10. The distance measuring device is realized as a laser distance meter. For the purpose of performing the machining operation, the distance measuring device has an acquisition unit, to enable the operator of the distance measuring device to manually input a reference characteristic quantity by means of the acquisition unit. In the present exemplary embodiment, the hand power tool 10, realized as a battery-operated hammer drill and/or chipping hammer, is disposed in front of a workpiece 38 realized as a wall. In this case, a tip of the tool 36 bears against the front side of the workpiece 38 that faces toward the operator. Disposed parallel to the tool 36 is the laser distance meter connected to the hand power tool 10, the laser distance meter in the present exemplary embodiment, for the purpose of illustration, being disposed geodetically above the hand power tool 10, also being able to assume other positions relative to the hand power tool 10, according to the particular application. During the machining operation of the hand power tool 10, or during the drilling operation of the hammer drill and/or chipping hammer, the laser distance meter acquires a distance in relation to the workpiece 38, as an actual characteristic quantity. As soon as the acquired actual characteristic quantity attains the reference characteristic quantity input in the laser distance meter, communication between the Bluetooth interface of the laser distance meter and the Bluetooth interface of the communication unit 14 initiates a switch-off of the hand power tool 10, and thus of the machining operation. The activation of the hand power tool 10 can be re-activated, for example, after a predefined period of time and/or after a repeated actuation of the switch-on/switch-off element 22. As an alternative to the above-mentioned disposition of the laser distance meter, the laser distance meter may be fastened to the workpiece 38, realized as a wall, and acquire the distance of the hand power tool 10, which changes during the machining operation. In a further alternative embodiment, the hand power tool ancillary device 18 may be disposed separately from the hand power tool 10 and from the workpiece 38, and acquire a relative movement, between the hand power tool 10 and the workpiece 38, that is transmitted, as electronic data, to the communication unit 14.

A further exemplary embodiment is shown in FIG. 2. The description that follows and the drawing are limited substantially to the differences between the exemplary embodiments, and in principle reference may also be made to the drawing and/or to the description of the other exemplary embodiment, in particular of FIG. 1, in respect of components having the same designation, in particular relating to components having the same references. To distinguish the exemplary embodiment, the letter a has been appended to the references of the exemplary embodiment in FIG. 2.

A further design of the system according to FIG. 2 comprises the hand power tool ancillary device 18a, realized as a level, which is provided to transmit to the open-loop and/or closed-loop control unit 12a, via a hand power tool interface 16a, at least one acquired position characteristic quantity that can be processed by an operating program of the open-loop and/or closed-loop control unit 12a for the purpose of controlling a machining operation. The level has a Bluetooth interface, which communicates with the Bluetooth interface of the communication unit 14a of a hand power tool 10a. For the purpose of performing the machining operation, the level has an acquisition unit that acquires the position characteristic quantity. The level is connected to the hand power tool 10a, parallel to a tool 36a of the hand power tool 10a realized as a hammer drill and/or chipping hammer. In this case, the tip of the tool 36a bears against the front side of a workpiece 38a that faces toward the operator. During the machining operation of the hand power tool 10a, or during the drilling operation of the hammer drill and/or chipping hammer, the acquisition unit of the level acquires a position characteristic quantity in relation to the workpiece 38a. In order to achieve a defined drilling angle in relation to a workpiece 38a, the power drill is held within a certain drilling corridor. In this case, a "drilling corridor" in this context is to be understood to mean, in particular, an alignment of a drilled hole that is produced by means of a power drill and that may deviate by a maximum angle of 3° from the alignment of the drilled hole. The drilling corridor is provided to produce, in particular, a drilled hole having an exact angle in relation to a workpiece, during a drilling operation. In particular, a drilling corridor is sought that is at right angles to a surface of the workpiece. In the case of a deviation from the drilling corridor, the operator of the hand power tool 10a and of the level, in addition to being provided with an optical and/or acoustic indication, is also provided with an interactive indication, via the hand power tool 10a. As a result of communication between the Bluetooth interface of the level and the Bluetooth interface of the communication unit 14a of the hand power tool 10a, either a vibratory motion and/or a switch-off of the hand power tool 10a, and thus of the machining operation, is initiated as an interactive indication.

As an alternative or in addition to the hand power tool ancillary device 18, the system has a further hand power tool, not represented here, and/or a further hand power tool ancillary device 18. For example, the system may have a hand power tool 10 and a first hand power tool ancillary device 18, realized as a distance measuring device, and a second hand power tool ancillary device 18a, realized as a level.

A producer of the hand power tool 10 uses the information obtained during the machining operation of the hand power tool 10 for further development of hand power tools 10.

What is claimed is:

1. A hand power tool comprising:
    an open-loop and/or closed-loop control unit; and
    a communication unit, which is connected to the open-loop and/or closed-loop control unit and which has a hand power tool interface for exchanging electronic data,
    at least one drive unit; and
    at least one switch-on/switch-off element configured to put the at least one drive unit into operation,
    wherein the hand power tool interface is activated or deactivated in dependence on a position of the switch-on/switch-off element,
    wherein the hand power tool interface is configured to be switched to a connectivity mode for a period of less than 15 minutes as a result of the switch-on/switch-off element being moved into a startup position and in dependence on a data connection to the at least one of the further hand power tool and the hand power tool ancillary device, and
    wherein the hand power tool interface is configured to communicate with at least one of a further hand power tool and a hand power tool ancillary device for the purpose of influencing an operating program of the open-loop and/or closed-loop control unit.

2. The hand power tool according to claim 1, wherein the hand power tool interface is configured to directly transmit electronic data to or directly receive electronic data from the at least one of the further hand power tool and the hand power tool ancillary device in one of a wireless and a wire-bound manner.

3. The hand power tool according to claim 1, further comprising:
    at least one electronic anti-theft mechanism configured to release or disable an operational readiness.

4. The hand power tool according to claim 3, wherein a release by the electronic anti-theft mechanism is maintained after breaking of a connection of a battery unit within a predefined time period.

5. The hand power tool according to claim 1, wherein the communication unit includes at least one storage unit configured to be connected to an external data unit via the hand power tool interface for the purpose of altering or storing hand power tool parameters.

6. The hand power tool according to claim 1, further comprising:
    at least one battery monitoring unit configured to monitor a battery capacity and to calculate an energy consumption of a battery unit during an operation of the hand power tool.

7. The hand power tool according to claim 1, wherein the hand power tool interface is configured to communicate with an external data unit for the purpose of at least one of documenting, evaluating, and analyzing electronic data of the communication unit.

8. A hand power tool comprising:
    an open-loop and/or closed-loop control unit; and
    a communication unit, which is connected to the open-loop and/or closed-loop control unit and which has a hand power tool interface for exchanging electronic data,
    at least one electronic anti-theft mechanism configured to release or disable an operational readiness,
    wherein a release by the electronic anti-theft mechanism is maintained after breaking of a connection of a battery unit within a predefined time period, and
    wherein the hand power tool interface is configured to communicate with at least one of a further hand power tool and a hand power tool ancillary device for the purpose of influencing an operating program of the open-loop and/or closed-loop control unit.

* * * * *